(12) United States Patent
Hasegawa et al.

(10) Patent No.: US 8,350,823 B2
(45) Date of Patent: Jan. 8, 2013

(54) COORDINATE POSITION DETECTING DEVICE

(75) Inventors: Takao Hasegawa, Osaka (JP); Takeshi Yamaguchi, Osaka (JP); Hiroshi Hamada, Osaka (JP); Ryota Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 737 days.

(21) Appl. No.: 12/066,735

(22) PCT Filed: Sep. 11, 2006

(86) PCT No.: PCT/JP2006/317969
§ 371 (c)(1),
(2), (4) Date: Nov. 2, 2009

(87) PCT Pub. No.: WO2007/032305
PCT Pub. Date: Mar. 22, 2007

(65) Prior Publication Data
US 2010/0073317 A1    Mar. 25, 2010

(30) Foreign Application Priority Data

Sep. 14, 2005   (JP) ................................. 2005-267469
Nov. 2, 2005    (JP) ................................. 2005-319927

(51) Int. Cl.
*G06F 3/045*   (2006.01)
(52) U.S. Cl. ..................................... 345/174; 178/18.06
(58) Field of Classification Search .......... 345/173–178; 178/18.01–18.11
See application file for complete search history.

(56) References Cited

U.S. PATENT DOCUMENTS

| 6,075,520 A | 6/2000 | Inoue et al. |
| 6,323,846 B1 | 11/2001 | Westerman et al. |
| 2002/0011991 A1 | 1/2002 | Iwasaki et al. |
| 2004/0217945 A1 | 11/2004 | Miyamoto et al. |
| 2005/0052429 A1* | 3/2005 | Philipp .......................... 345/173 |
| 2005/0162408 A1* | 7/2005 | Martchovsky ................ 345/173 |

FOREIGN PATENT DOCUMENTS

| JP | 03-289715 | 12/1991 |
| JP | 07-219708 | 8/1995 |
| JP | 2005-301974 | 10/2005 |

OTHER PUBLICATIONS

English Translation of the International Preliminary Report on Patentability mailed Sep. 18, 2008 in corresponding PCT Application No. PCT/JP2006/317969.

International Search Report for PCT/JP2006/317969 dated Nov. 28, 2006.

* cited by examiner

*Primary Examiner* — Amare Mengistu
*Assistant Examiner* — Vinh Lam
(74) *Attorney, Agent, or Firm* — Nixon & Vanderhye, P.C.

(57) ABSTRACT

A coordinate detection device according to the present invention includes: a conductor for locating a point of contact; multiple terminals that are connected to the conductor at mutually different points; a signal output section, which includes a charge storage section to store electrical charge there and which outputs a signal with a voltage value representing the quantity of charge stored in the charge storage section; a setting section for setting a voltage for the charge storage section equal to a predetermined value; and a switching section for selectively connecting or disconnecting a particular one of the terminals to/from not only the charge storage section but also a predetermined power supply.

6 Claims, 10 Drawing Sheets

PRIOR ART

COORDINATE POSITION DETECTING DEVICE

This application is the U.S. national phase of International Application No. PCT/JP2006/317969 filed 11 Sep. 2006 which designated the U.S. and claims priority to Japanese Patent Application No. 2005-267469 filed 14 Sep. 2005 and Japanese Patent Application No. 2005-319927 filed 2 Nov. 2005, the entire contents of each of which are hereby incorporated by reference.

TECHNICAL FIELD

The present invention relates to a coordinate detection device (also called a "touchscreen sensor" or a "touchscreen panel") that can locate a point of contact that has been made on the display screen with a finger, for example. More particularly, the present invention relates to a coordinate detection device of an electrostatic capacitive coupling type.

BACKGROUND ART

A coordinate detection device is an input device that can be used for entering information by directly touching a display screen such as an LCD, and is a Pointing device that can input absolute coordinates. Hereinafter, the fundamental principle of such a coordinate finding method by electrostatic capacitive coupling will be described with reference to FIG. 9.

FIG. 9 shows a one-dimensional resistive body that is interposed between electrode terminals A and B for the sake of simplicity. In an actual display device, however, a touchscreen panel with a two-dimensional range functions similarly to this one-dimensional resistor.

A current-voltage converting resistor r is connected to each of these electrode terminals A and B. And these electrode terminals A and B are further connected to a coordinate detection device by way of a switching circuit.

An AC voltage e having the same phase and the same potential is applied between the electrode terminal A and the ground and between the electrode terminal B and the ground. In this case, these electrode terminals A and B are always at the same potential level, and therefore, no current flows between the electrode terminals A and B.

Suppose contact has been made at a point C with a finger, for example. In that case, if the resistance produced between the point C of finger contact and the electrode terminal A is R1, the resistance produced between the point C of finger contact and the electrode terminal B is R2, R=R1+R2, the finger has impedance Z, and amounts of current flowing through the electrode terminals A and B are i1 and i2, respectively, the following equations are satisfied:

$$e = r \times i1 + R1 \times i1 + (i1+i2)Z \quad (1)$$

$$e = r \times i2 + R2 \times i2 + (i1+i2)Z \quad (2)$$

Although induction is not taken into consideration, the following Equation (3) can be derived from these Equations (1) and (2):

$$R1/R = (2r/R+1)i2/(i1+i2) - r/R \quad (3)$$

Since r and R are already known, the R1/R ratio can be calculated by Equation (3) just by measuring the amounts i1 and i2 of current flowing through the electrode terminals A and B. As a result, the coordinates can he determined. It should be noted that the R1/R ratio does not depend on the impedance Z the person who has made a finger contact. That is why unless the impedance Z is zero or infinity, Equation (3) is always satisfied and variations or state transitions caused by the person or the material are negligible.

Next, it will be described with reference to FIGS. 10 and 11 what equations should be satisfied when the coordinate finding range is expanded from the one-dimensional one into a two-dimensional one. In this example, four electrode terminals A, B, C and D are arranged at the four corners of a touchscreen panel 11 as shown in FIG. 10. All of these electrode terminals A through D are connected to a coordinate detection device.

As shown in FIG. 11, an AC voltage having the same phase and the same potential level is applied to those electrode terminals A through D at the four corners of the touchscreen panel 11. Supposing the amounts of current flowing through the four corners of the touchscreen panel 11 as a result of a finger contact, for example, are i1, i2, i3 and i4, respectively, the following equations are obtained by making similar calculations:

$$X \times k1 + k2 \cdot (i2+i3)/(i1+i2+i3+i4) \quad (4)$$

$$X \times k1 + k2 \cdot (i1+i2)/(i1+i2+i3+i4) \quad (5)$$

where X and Y are the X and Y coordinates of the point of contact on the touchscreen panel 11, k1 is an offset, and k2 is a magnification in this case, k1 and k2 are constants that do not depend on the impedance of the person who made the contact. Just by measuring the amounts i1 through i4 of current flowing through these four electrodes, the point of contact can be determined based on these Equations (4) and (5).

FIG. 12 illustrates a conventional coordinate detection device that adopts the fundamental principle of such a coordinate finding method by the capacitive coupling technique (see Patent Document No. 1, for example).

As shown in FIG. 12, the coordinate detection device includes four current variation detectors 1. An AC oscillator 5 applies an AC voltage to each of the electrode terminals 7 through 10. As the impedance produced by a finger has capacitive components, alternating current flows through each of these electrode terminals 7 through 10.

The current variation detectors 1 measure the amounts of current flowing between the electrode terminals 7, 8, 9 and 10 of the touchscreen panel and the ground. Also, the current variation detectors 1 sense a variation in impedance, which is caused by a finger contact, for example, between, the electrode terminals 7 through 10 and the ground as a variation in current. The output signal of each of these current variation detectors 1 is subjected to amplification and bandpass filtering by its associated analog signal processor 2. The output signal of each of these analog signal processors 2 is detected by its associated detection filtering circuit 3 and then supplied to its associated noise reducing DC generator 4. The noise reducing DC generator 4 converts the output signal of the detection filtering circuit 3 into direct current and outputs a signal representing a voltage value that is proportional to the amount of current flowing through its associated electrode terminal 7, 8, 9 or 10 to a controller 6. In response, the controller 6 determines the coordinates based on this voltage value.

Meanwhile, as shown, in FIG. 13, a coordinate detection device for determining coordinates by detecting the response of a pulse signal that has been applied to a touchscreen panel using a transformer has also been proposed (in Patent Document No. 2, for example).

Patent Document No. 1: Japanese Patent Application Laid-Open Publication No. 2003-66417

Patent Document No. 2: Japanese Patent Application Laid-Open Publication No. 7-219708

DISCLOSURE OF INVENTION

Problems to be Solved by the Invention

In order to convert an AC signal into a DC signal, the coordinate detection device shown in FIG. 12 should sample the AC signal over a number of periods, thus taking a lot of time to determine the coordinates. Besides, the longer the time it takes to determine the coordinates, the more power would be dissipated by the overall system, which is also a problem.

Meanwhile, the coordinate detection device shown in FIG. 13 uses a transformer, and therefore, it is difficult to build such a detection device in a small integrated circuit.

An object of the present invention is to provide a coordinate detection device that can determine coordinates in a shorter time with the power dissipation cut down.

Means for Solving the Problems

A coordinate detection device according to the present invention includes: a conductor for locating a point of contact; multiple terminals that are connected to the conductor at mutually different points; a signal output section, which includes a charge storage section to store electrical charge there and which outputs a signal with a voltage value representing the quantity of charge stored in the charge storage section; a setting section for setting a voltage for the charge storage section equal to a predetermined value; and a first switching section for selectively connecting or disconnecting a particular one of the terminals to/from not only the charge storage section but also a first predetermined power supply.

In one preferred embodiment, the coordinate detection device further includes a control section for controlling the operation of the first switching section. The control section turns the first switching section to change states from a first state in which the particular terminal is connected to the charge storage section but disconnected from the first predetermined power supply into a second state which the particular terminal is connected to the first predetermined power supply but disconnected from the charge storage section, and vice versa, a predetermined number of times. After the states have been changed the predetermined number of times, the signal output section outputs the signal.

In this particular preferred embodiment, the charge storage section is a first capacitor. Before the states are changed the predetermined number of times, the setting section sets potential levels at two terminals of the first capacitor equal to each other.

In another preferred embodiment, the coordinate detection device further includes a circuit that has a second capacitor, one of two terminals of which is grounded, and a second switching section for selectively connecting or disconnecting the signal output section to/from the other terminal of the second capacitor.

In still another preferred embodiment, the coordinate detection device further includes a compensator for supplying current, which compensates for current flowing through a parasitic capacitance between the conductor and the first switching section, to the particular terminal.

In this particular preferred embodiment, the compensator includes: a third capacitor, one of two terminals of which is grounded; and a third switching section for selectively connecting or disconnecting not only the charge storage section but also a second predetermined power supply to/from the other terminal of the third capacitor.

In a specific preferred embodiment, the control section turns the third switching section to connect the other terminal of the third capacitor to the charge storage section but disconnect the other terminal from the second predetermined power supply during the first state and to connect the other terminal of the third capacitor to the second predetermined power supply but disconnect the other terminal from the charge storage section during the second state.

In another preferred embodiment, the coordinate detection device further includes a sensing section for locating a point of contact, which has been made either directly or indirectly on the conductor, by the signal supplied from the signal output section.

Another coordinate detection device according to the present invention includes: a conductor for locating a point of contact; multiple terminals that are connected to the conductor at mutually different points; a signal output section, which includes a charge storage section to store electrical charge there and which outputs a signal with a voltage value representing the quantity of charge stored in the charge storage section; a setting section for setting a voltage for the charge storage section equal to a predetermined value; a first switching section for selectively connecting or disconnecting a particular one of the terminals to/from not only the charge storage section but also a first power supply; and a control section for controlling the operation of the first switching section. The control section turns the first switching section to change states from a first state in which the particular terminal is connected to the charge storage section but disconnected from the first power supply into a second state in which the particular terminal is connected to the first power supply but disconnected from the charge storage section, and vice versa, a predetermined number of times. After the states have been changed the predetermined number of times, the signal output section outputs the signal. The control section changes the numbers of times of state transition between the first and second states according to the voltage value of the signal.

In one preferred embodiment, the control section changes the numbers of times such that the voltage value of the signal falls within a prescribed range.

In another preferred embodiment, the signal output section includes multiple signal output sections and the first switching section includes multiple switching sections of a first type. Each of the multiple terminals is connected to an associated one of the signal output sections by way of an associated one of the switching sections of the first type. The control section performs a predetermined type of calculation based on the voltage values of the signals supplied from the signal output sections and changes the numbers of times such that a value obtained by the predetermined type of calculation falls within a prescribed range.

In still another preferred embodiment, the charge storage section is a first capacitor. Before the states are changed the predetermined number of times, the setting section sets potential levels at two terminals of the first capacitor equal to each other.

In yet another preferred embodiment, the coordinate detection device further includes a compensator for supplying current, which compensates for current flowing through a parasitic capacitance between the conductor and the first switching section, to the particular terminal.

In this particular preferred embodiment, the compensator includes: a second capacitor, one of two terminals of which is grounded; and a second switching section for selectively connecting or disconnecting not only the charge storage section but also a second power supply to/from the other terminal of the second capacitor.

In a specific preferred embodiment, the control section turns the second switching section to connect the other terminal of the second capacitor to the charge storage section but disconnect the other terminal from the second power supply during the first state and to connect the other terminal of the second capacitor to the second power supply but disconnect the other terminal from the charge storage section during the second state.

In yet another preferred embodiment, the coordinate detection device further includes a sensing section for locating a point of contact, which has been made either directly or indirectly on he conductor, by the signal supplied from the signal output section.

Still another coordinate detection device according to the present invention includes: a conductor for locating a point of contact; multiple terminals that are connected to the conductor at mutually different points; a signal output section, which includes a variable capacitance element to store electrical charge there and which outputs a signal with a voltage value representing the quantity of charge stored in the variable capacitance element; a setting section for setting a voltage for the variable capacitance element equal to a predetermined value; a switching section for selectively connecting or disconnecting a particular one of the terminals to/from not only the variable capacitance element bet also a predetermined power supply; and a control section for adjusting the capacitance of the variable capacitance element according to the voltage value of the signal.

In one preferred embodiment, the control section adjusts the capacitance of the variable capacitance element such that the voltage value of the signal falls within a prescribed range.

In another preferred embodiment, the signal output section includes multiple signal output sections and the switching section includes multiple switching sections. Each of the multiple terminals is connected to an associated one of the signal output sections by way of an associated one of the switching sections. The control section performs a predetermined type of calculation based on the voltage values of the signals supplied from the signal output sections and adjusts the capacitance of the variable capacitance element such that a value obtained by the predetermined type of calculation falls within a prescribed range.

Effects of the Invention

According to the present invention, a point of contact that has been made on a conductor is located based on the voltage representing the quantity of electrical charge that has been stored in a charge storage section, which is connected to the conductor by way of a switching element. Since there is no need to sample an AC signal over multiple periods unlike the prior art, the present invention contributes to determining the coordinates in a shorter time and cutting down the power dissipation.

In one preferred embodiment of the present invention, the capacitance of the charge storage section is adjusted according to a voltage value representing the quantity of electrical charge stored in the charge storage section. In another preferred embodiment of the present invention, the numbers of times the conductor is connected to the charge storage section are changed according to a voltage value representing the quantity of electrical charge stored in the charge storage section. By adjusting the capacitance of the charge storage section and/or changing the numbers of times of connection such that the voltage value representing the quantity of charge falls within a normal range, the coordinates can be determined with higher accuracy.

Besides, since the coordinate detection device of the present invention needs no transformer, the detection device can be easily built in an integrated circuit.

DESCRIPTION OF REFERENCE NUMERALS

Figure 1:
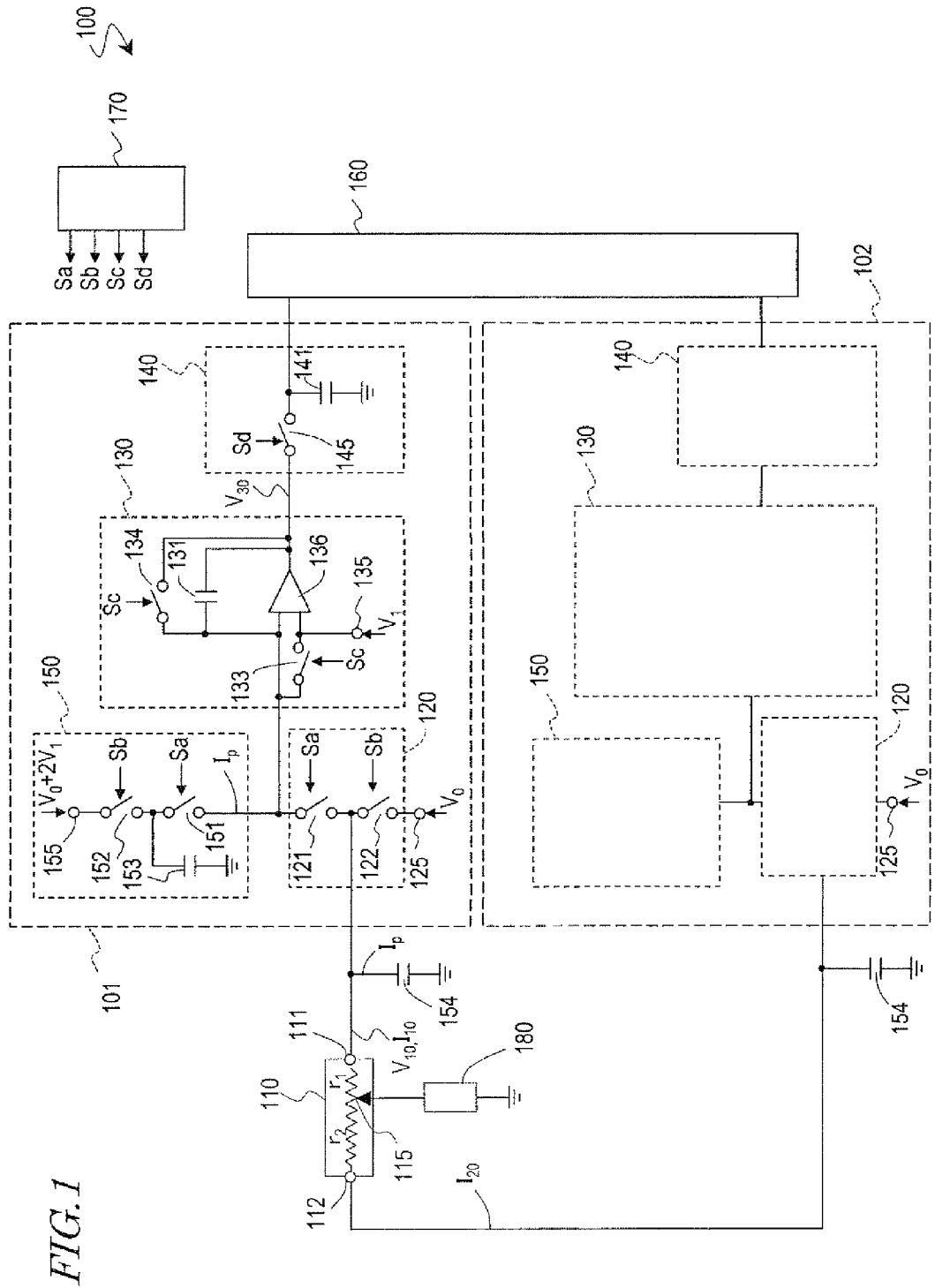
FIG. 1 illustrates a coordinate detection device as a first preferred embodiment of the present invention.

100, 200, 300 coordinate detection device
   101, 102, 201, 202, 301, 302 converter
110 conductor
120 switching section
130, 230, 330 signal output section
140 sample-and-hold circuit
150 compensator
160 calculator
170, 370 control section
180 contact body
371 comparator section
400 adder
500 maximum/minimum circuit

BEST MODE FOR CARRYING OUT THE INVENTION

Hereinafter, preferred embodiments of a coordinate detection device according to the present invention will be described with reference to the accompanying drawings.

Embodiment 1

A first preferred embodiment of a coordinate detection device according to the present invention will be described with reference to FIG. 1, which illustrates the coordinate detection device 100 of this first preferred embodiment.

The coordinate detection device 100 includes a conductor 110, with which a contact body 180 such as a finger or a stylus makes direct or indirect contact, multiple terminals 111 and 112, which are connected to the conductor 110 at mutually different points, and converters 101 and 102 for converting the point of contact made by the contact body 180 on the conductor 110 into a voltage. The converters 101 and 102 are connected to the terminals 111 and 112, respectively. Since the converters 101 and 102 have quite the same configuration and operate in totally the same way, only the configuration and operation of the converter 101 will be described herein without describing those of the converter 102. In the following example, a preferred embodiment that uses a one-dimensional conductor 110 as a conductor where the point of contact needs to be located will be described for the sake of simplicity. However, the same operating principle will apply to even a situation where a two-dimensional conductor such as a panel is adopted.

The converter 101 includes a signal output section 130 with a capacitor 131 and a differential amplifier 136, a switching section 120 that connects the terminal 111 and the signal output section 130 together, a sample-and-hold circuit 140 that samples and holds the output signal of the signal output section 130, and a compensator 150 that compensates for current flowing through a parasitic capacitance.

The capacitor 131 functions as a charge storage section for storing electrical charge there. One terminal of the capacitor 131 is connected to one of the two input terminals of the differential amplifier 136. The other input terminal of the differential amplifier 136 is connected to a power supply terminal 135, to which a voltage $V_1$ (which is an arbitrary voltage) is applied. The other terminal of the capacitor 131 is connected to the output terminal of the differential amplifier 136.

The signal output section 130 further includes a switching element 133 that selectively connects or disconnects the one terminal of the capacitor 131 (that is connected to the input terminal of the differential amplifier 136) to/from the power supply terminal 135, and another switching element 134 that selectively connects or disconnects the two terminals of the capacitor 131 to/from each other. The switching elements 133 and 134 together work as a setting section that sets the voltage between the two terminals of the capacitor 131 equal to a predetermined value $V_1$.

The switching section 120 includes a switching element 121 that selectively connects or disconnects the terminal 111 and the capacitor 131 to/from each other, and another switching element 122 that selectively connects or disconnects the terminal 111 and another power supply terminal 125, to which a voltage $V_0$ (which could be ground potential, for example) is applied.

The sample-and-hold circuit 140 includes a capacitor 141 that samples and holds the output signal of the signal output section 130, and a switching element 145 that selectively connects or disconnects one terminal of the capacitor 141 and the output terminal of the differential amplifier 136 to/from each other.

The compensator 150 includes a capacitor 153 and two switching elements 151 and 152. The switching element 152 selectively connects or disconnects one terminal of the capacitor 153 and a power supply terminal 155, to which a voltage ($V_0+2V_1$) is applied, to/from each other. The switching element 151 selectively connects or disconnects the one terminal of the capacitor 153 to/from the switching element 121. The other terminal of the capacitor 153 is grounded. The switching elements 151 and 152 function as a switching section that selectively connects or disconnects the one terminal of the capacitor 153 to/from not only the capacitor 131 but also the power supply terminal 155. The capacitance of the capacitor 153 is set equal to the parasitic capacitance 154 produced between the conductor 110 and the switching section 120. To compensate for current $I_p$ flowing through the parasitic capacitance 154, the compensator 150 supplies the same amount of current $I_p$ to the terminal 111 by way of the switching element 121.

The coordinate detection device 100 further includes a calculator 160 that locates the point of contact that has been made either directly or indirectly with the conductor 110 and a control section 170 that controls switching the ON and OFF states (i.e., connected and disconnected states) of the respective switching elements.

The calculator 160 functions as a sensing section for locating the point of contact that has been made either directly or indirectly on the conductor 110. Specifically, the calculator 160 receives the respective output signals of the sample-and-hold circuits 140 of the two converters 101 and 102 and makes calculations on the voltage values represented by those output signals, thereby locating the point of contact.

While the control section 170 supplies a control signal Sa to the switching elements 121 and 151, the switching elements 121 and 151 are turned ON. On the other hand, while the control section 170 does not supply the control signal Sa thereto, the switching elements 121 and 151 are turned OFF. While the control section 170 supplies a control signal Sb to the switching elements 122 and 152, the switching elements 122 and 152 are turned ON. On the other hand, while the control section 170 does not supply the control signal Sb thereto, the switching elements 122 and 152 are turned OFF. While the control section 170 supplies a control signal Sc to the switching elements 133 and 134, the switching elements 133 and 134 are turned ON. On the other hand, while the control section 170 does not supply the control signal Sc thereto, the switching elements 133 and 134 are turned OFF. And while the control section 170 supplies a control signal Sd to the switching element 145, the switching element 145 is turned ON. On the other hand, while the control section 170 does not supply the control signal Sd thereto, the switching element 145 is turned OFF.

As coordinates have been assigned to the conductor 110, the coordinate detection device 100 determines the coordinates of the point of contact that has been made by a contact body 180 such as a finger or a stylus (with impedance) with the conductor 110. A voltage is applied periodically to the conductor 110. Thus, when the contact body 180 makes contact with the conductor 110, current flows through the contact body 180, thereby charging the contact body 180. A finger may have a capacitance of approximately 100 Pf, for example, and applies a pulse voltage of approximately 1 µSec to the conductor 110.

Hereinafter, it will he described exactly how this coordinate detection device 100 operates.

First, the control section 170 turns ON the switching elements 122, 133, 134 and 152 and turns OFF the switching elements 121, 145 and 151. In this state, the voltage $V_{10}$ at the terminal 111 is set equal to $V_0$ and the potential difference between the two terminals of the capacitor 153 is set equal to $V_0+2V_1$. Meanwhile, in this case, the same voltage $V_1$ is applied to the two terminals of the capacitor 131, and therefore, the potential difference between those two terminals of the capacitor 131 becomes 0 V.

Next, the control section 170 turns ON the switching elements 121, 145 and 151 and turns OFF the switching elements 122, 133, 134 and 152. In such a state, the capacitor 131 is connected to the terminal 111 and current $I_{10}$ flows through the contact body 180. The current $I_{10}$, the amount of which is determined by the magnitudes of capacitance and resistance $r_1$ of the contact body 180, flows between the capacitor 131 and the terminal 111 to vary the quantity of electrical charge that has been stored in the capacitor 131 (i.e., charge or discharge the capacitor 131). Also, as the capacitor 131, the terminal 111 and the one terminal of the capacitor 153 are connected together, the current $I_p$ flowing through the parasitic capacitance 154 is compensated for by the same amount of current $I_p$ flowing from the capacitor 153. The differential amplifier 136 outputs a signal with a voltage $V_{30}$ representing the quantity of electrical charge that has been stored in the capacitor 131. As a result, the potential difference between the two terminals of the capacitor 141 becomes equal to $V_{30}$ and the voltage $V_{30}$ is sampled. And when the switching element 145 is turned OFF, the voltage $V_{30}$ is held in the capacitor 141.

The calculator 160 receives the output voltage $V_{30}$ of the capacitor 141. Specifically, the calculator 160 receives the respective output signals of the capacitors 141 of the two converters 101 and 102. Just as the current $I_{10}$ flows between the terminal 111 and the converter 101, current $I_{20}$ flows between the terminal 112 and the converter 102. The amounts of these currents $I_{10}$ and $I_{20}$ vary according to a difference in magnitude between the resistances $r_1$ and $r_2$. That is to say, according to the difference in magnitude between the resistances $r_1$ and $r_2$, the respective output signals of the capacitors 141 of the two converters 101 and 102 vary their voltage values. However, based on the voltage values of both of these two output signals, the calculator 160 figures out and determines the coordinates of the point of contact that has been made on the conductor 110. As a result, the contact body 180 that has made contact with the conductor 110 (i.e., the point of their contact) can be located.

Next, it will be described more fully how the calculator 160 locates the point of contact based on the signal with the voltage $V_{30}$.

When the contact body 180 makes contact with the conductor 110, current flows through the contact body 180. The resistance produced between the point of contact 115 and the terminal 111 is supposed to be $r_1$, while the resistance produced between the point of contact 115 and the terminal 112 is supposed to be $r_2$. The current $I_{10}$ flows through the contact body 180 by way of the resistance $r_1$ and the current $I_{20}$ flows through the contact body 180 by way of the resistance $r_2$. Voltages of the same phase are applied to the resistances $r_1$ and $r_2$ and the amounts of the currents $I_{10}$ and $I_{20}$ are inversely proportional to the values of the resistances $r_1$ and $r_2$, respectively. That is why the ratio of the currents $I_{10}$ and $I_{20}$ is represented as $I_{10}: I_{20} = r_2: r_1$.

The currents $I_{10}$ and $I_{20}$ are supplied to the capacitor 131. The signal output section 130 converts the quantity of charge $Q_1$ for the current $I_{10}$ and the quantity of charge $Q_2$ for the current $I_{20}$ into voltages $v_{11}$ and $v_{12}$ (corresponding to the voltage $V_{30}$), respectively. Since the ratio of the currents $I_{10}$ and $I_{20}$ is equal to the ratio of the quantities of charge $Q_1$ and $Q_2$, $v_{11}:v_{12}=Q_1:Q_2=I_{10}:I_{20}=r_2:r_1$ is satisfied. Thus, as the ratio of the voltages $v_{11}$ and $v_{12}$ satisfies a predetermined relation with respect to the ratio of the resistances $r_1$ and $r_2$ as described above, the calculator 160 can determine the coordinates by the ratio of the voltages of the input signals.

The coordinate detection device 100 detects the magnitudes of the resistances $r_1$ and $r_2$, showing where the point of contact is located, as a variation in the quantity of charge stored in the capacitor 131. Since the point of contact can be located by charging (or discharging) the capacitor 131 at least once, there is no need to sample an AC signal over multiple periods unlike the prior art. As a result, the coordinates can be determined in a shorter time. In addition, since the calculator 160 may be suspended while the sample-and-hold circuit outputs no signals, the power dissipation can be cut down, too.

Embodiment 2

Figure 3:
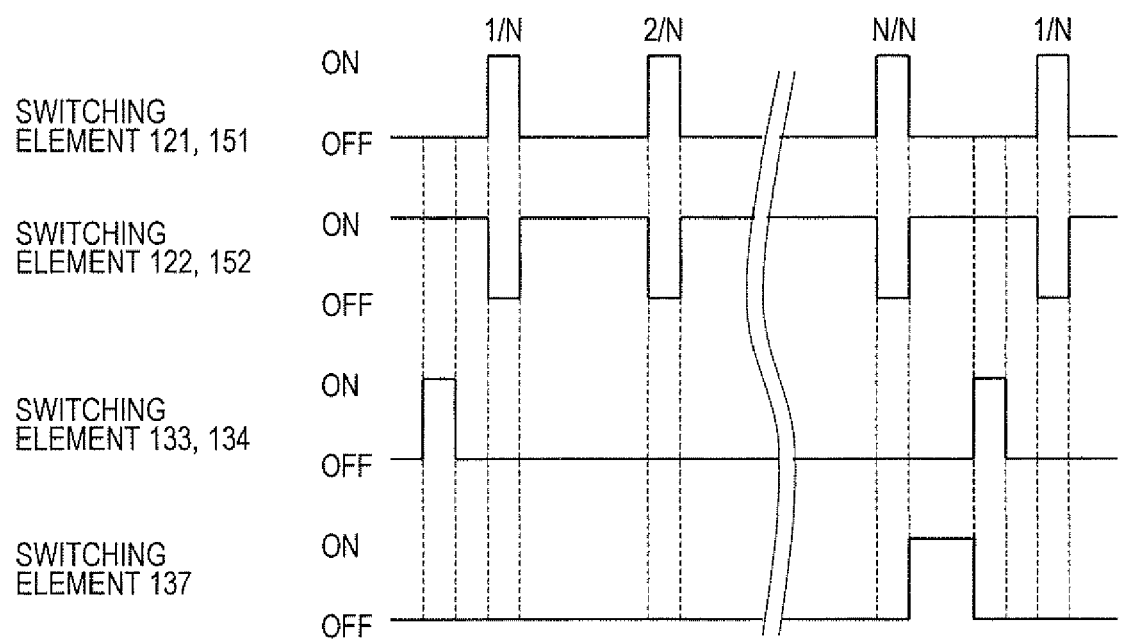
FIG. 3 is a timing diagram showing the timings of operation of switching elements in the second preferred embodiment of the present invention.
Figure 4:
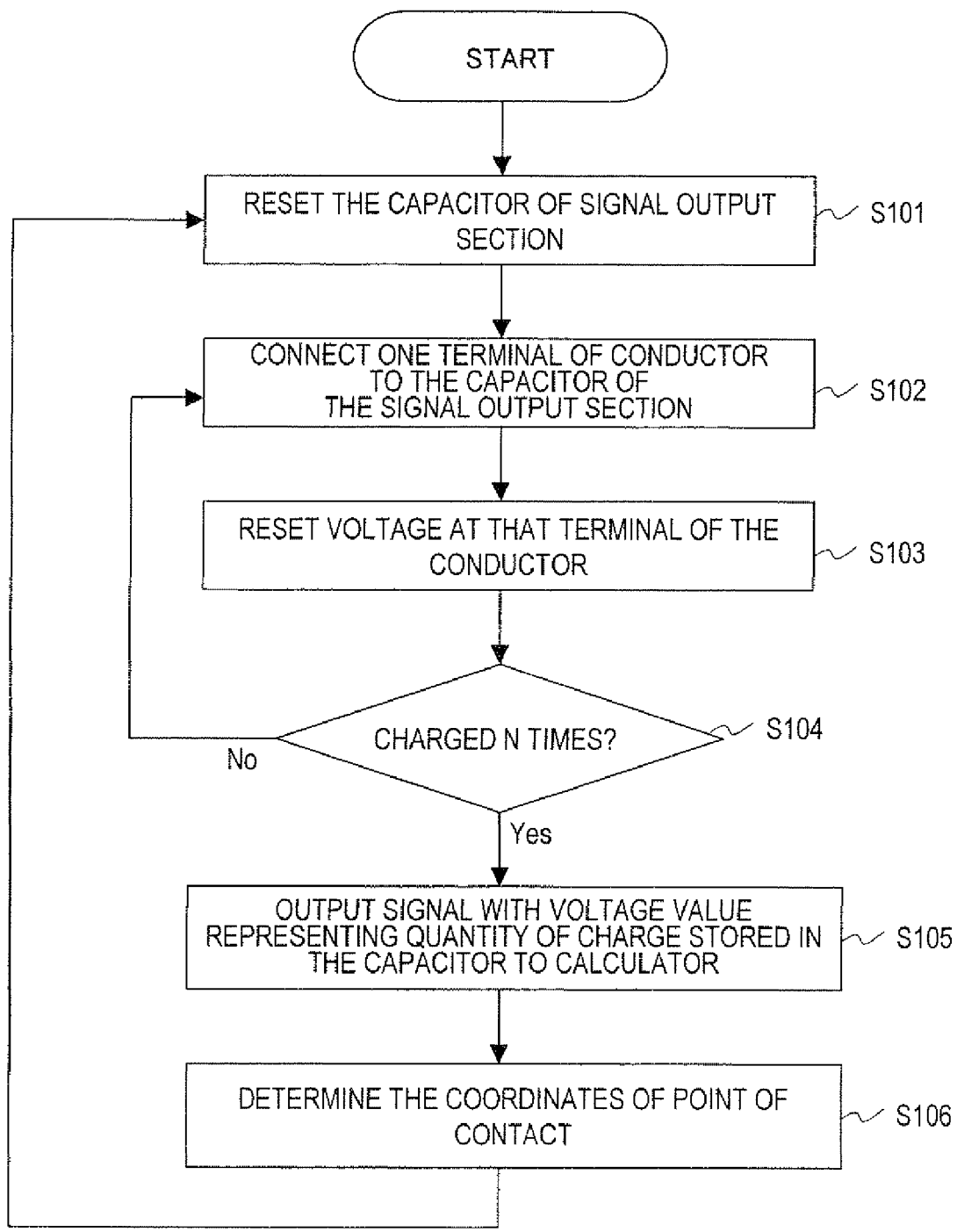
FIG. 4 is a flowchart showing how the coordinate detection device of the second preferred embodiment of the present invention operates.

A second preferred embodiment of a coordinate detection device according to the present invention will be described with reference to FIGS. 2, 3 and 4.

Figure 2:
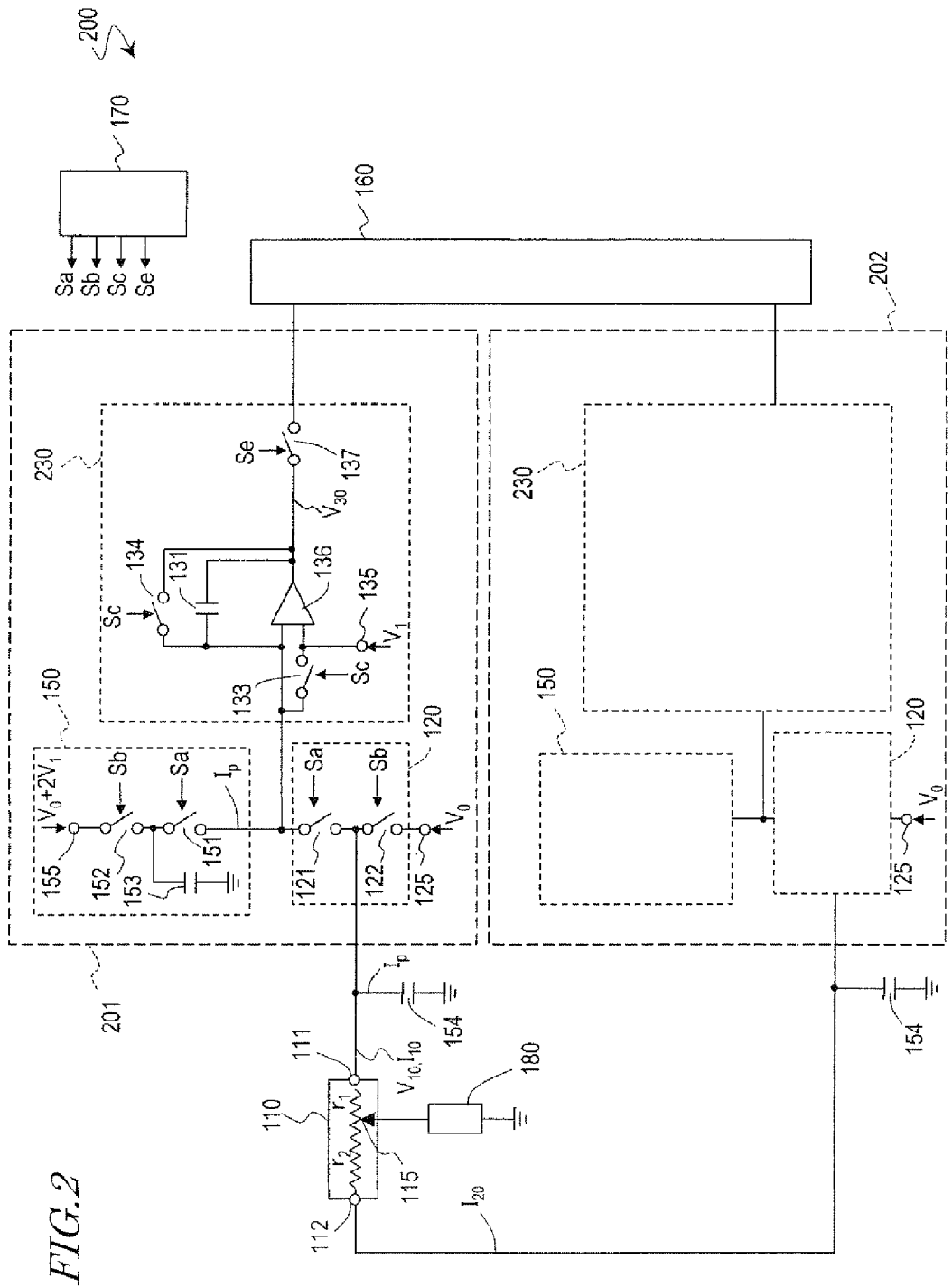
FIG. 2 illustrates a coordinate detection device as a second preferred embodiment of the present invention.

First, look at FIG. 2, which illustrates a coordinate detection device 200 according to this preferred embodiment.

Unlike the coordinate detection device 100 shown in FIG. 1, the coordinate detection device 200 includes converters 201 and 202 in place of the converters 101 and 102. Since the converters 201 and 202 have quite the same configuration and operate in totally the same way, only the configuration and operation of the converter 201 will be described herein without describing those of the converter 202.

Compared to the converter 101, the converter 201 has no sample-and-hold circuit 140 but includes a signal output section 230 in place of the signal output section 130. The signal output section 230 includes not only all components of the signal output section 130 but also a switching element 137 that selectively connects or disconnects the output terminal of the differential amplifier 136 to/from the calculator 160. To control the operation of the switching element 137, the control section 170 outputs a control signal Se to the switching element 137. While the control section 170 supplies the control signal Se to the switching element 137, the switching element 137 is turned ON. On the other hand, while the control section 170 does not supply the control signal Se thereto, the switching element 137 is turned OFF. The other components of the coordinate detection device 200 are the same as the counterparts of the coordinate detection device 100 but operate at different timings than the counterparts of the coordinate detection device 100.

In the configuration shown in FIG. 1, the output signal of the signal output section 130, having the voltage $V_{30}$, is temporarily held in the capacitor 141 of the sample-and-hold circuit 140. When the capacitor 141 is discharged, the calculator 160 receives the signal with the voltage $V_{30}$. By filtering the signal with the time constant of the sample-and-hold circuit 140 adjusted, decrease in coordinate determination accuracy due to some disturbance such as noise could be minimized. However, since it would take a while to charge or discharge the capacitor 141 due to the time constant of the capacitor 141, some delay would be inevitable before the calculator 160 gets ready to start making calculations.

On the other hand, by omitting the sample-and-hold circuit 140, the coordinate detection device 200 of this preferred embodiment eliminates the delay that would be caused by the sample-and-hold circuit 140 before the calculator 160 gets ready to start making calculations, thereby further increasing the coordinate finding rate. Also, to prevent the coordinate determination accuracy from being decreased by noise or any other disturbance, it is not until the coordinate detection device 200 charges (or discharges) the capacitor 131 a number of times that the signal output section 230 outputs the signal to the calculator 160. By charging or discharging the capacitor 131 a number of times (i.e., by performing summation processing), the influence of disturbance such as noise can be reduced. For example, if there is noise with a periodic waveform such as hum noise, the influence of the noise can be reduced by charging the capacitor 131 a number of times during one period of the noise.

Hereinafter, it will be described in detail with reference to FIGS. 2, 3 and 4 how the coordinate detection device 200 operates. FIG. 3 is a timing diagram showing the timings to operate the respective switching elements. FIG. 4 is a flowchart showing how the coordinate detection device 200 operates. In the operation example shown in FIGS. 3 and 4, the capacitor 131 is charged N times (where N is a natural number).

First, the control section 170 turns ON the switching elements 122, 133, 134 and 152 and turns OFF the switching elements 121, 137 and 151. In this state, the voltage $V_{10}$ at the terminal 111 is set equal to $V_0$ and the potential difference between the two terminals of the capacitor 153 is set equal $V_0+2V_1$. Meanwhile, in this case, the same voltage $V_1$ is applied to the two terminals of the capacitor 131, and therefore, the potential difference between those two terminals of the capacitor 131 becomes 0 V. As a result, the stored charge is reset (in Step S101).

Next, the control section 170 turns ON the switching elements 121 and 151 and turns OFF the switching elements 122, 133, 134 and 152. In such a state, the capacitor 131 is connected to the terminal 111 and current $I_{10}$ flows through the contact body 180. The current $I_{10}$, the amount of which is determined by the magnitudes of capacitance and resistance $r_1$ of the contact body 180, flows between the capacitor 131 and the terminal 111 to vary the quantity of electrical charge that has been stored in the capacitor 131 (in Step S102). Also, as the capacitor 131, the terminal 111 and the one terminal of the capacitor 153 are connected together, the current $I_p$ flowing through the parasitic capacitance 154 is compensated for by the same amount of current $I_p$ flowing from the capacitor 153. Thereafter, the control section 170 turns ON the switching elements 122 and 152 and turns OFF the switching elements 121 and 151, thereby resetting the voltage $V_{10}$ at the terminal 111 and completing the charge operation for the first time (in Step S103).

When the charge operation is performed for the second time, the switching elements 121 and 151 are turned ON and the switching elements 122 and 152 are turned OFF. After that, the control section 170 turns ON the switching elements 122 and 152 and turns OFF the switching elements 121 and 151. In this manner, the charge operation gets done for the second time. Thereafter, such a charge operation will be performed repeatedly N times (in Step S104).

And when the charge operation gets done for the $N^{th}$ time, the control section 170 turns ON the switching elements 122, 137 and 152 and turns OFF the switching elements 121 and 151. When the switching element 137 is turned ON, the differential amplifier 136 outputs a signal with a voltage $V_{30}$, representing the quantity of electrical charge that has been stored in the capacitor 131 through the number N of charge operations, to the calculator 160 (in Step S105).

The calculator 160 receives the respective output signals of the signal output sections 230 of the two converters 201 and 202 and figures out and determines the coordinates of the point of contact that has been made on the conductor 110. As a result, the contact body 180 that has made contact with the conductor 110 (i.e., the point of their contact) can be located (in Step S106).

When the differential amplifier 136 outputs the signal to calculator 160, the switching element 137 is turned OFF. Then, the first one of a number N of charge operations is started and the same charge operation will be performed repeatedly until it gets done for the $N^{th}$ time.

As described above, by charging or discharging the capacitor 131 a number of times (i.e., by performing summation processing), the coordinate detection device 200 can reduce the influence of disturbance such as noise.

Optionally, the number of times the capacitor 131 is charged or discharged (i.e., the N value) may he changed according to the level of disturbance such as noise. For example, in a situation where there is little noise, the difference in quantity of charge between the respective capacitors 131 of the converters 201 and 202 can be clarified even by performing the charge or discharge operation a small number of times. That is why the coordinate determining operation can be performed accurately even if the number of times of charging or discharging is decreased. Also, the smaller the number of times of charging or discharging, the higher the coordinate finding rate can be. The noise level can be measured by a noise sensor provided for the coordinate detection device 200. And the numbers of times of charging or discharging may be changed according to the noise level measured. Alternatively, either the calculator 160 or the control section 170 may determine the noise level by comparing the output signals of the converters 201 and 202 to each other and may change the number of times of charging or discharging according to the noise level. For example, the output signals of the converters 201 and 202 may be compared to each other when the contact body 180 is making contact with the conductor 110 at an arbitrary point e.g., at an end of the conductor 110). If the difference between the voltage values represented by those signals is equal to or greater than a predetermined threshold value, then the noise level may be determined to be low and the number of times of charging or discharging may be decreased.

Embodiment 3

Depending on the environment in which a coordinate detection device is used, the voltage $V_{30}$ of the output signal of the signal output section 230 could vary so much as to fall out of a normal range. As such a variation in voltage $V_{30}$ would cause a decrease in coordinate determination accuracy, the circuit constants and/or operations are preferably controlled such that the voltage $V_{30}$ falls within the normal range.

Hereinafter, a third preferred embodiment of a coordinate detection device according to the present invention will be described with reference to FIGS. 5 and 6.

First, look at. FIG. 5, which illustrates a coordinate detection device 300 according to this preferred embodiment.

Unlike the coordinate detection device 200 shown in FIG. 2, the coordinate detection device 300 includes converters 301 and 302 in place of the converters 201 and 202. Also, the coordinate detection device 300 includes a control section 370. Since the converters 301 and 302 have quite the same configuration and operate in totally the same way, only the configuration and operation of the converter 301 will be described herein without describing those of the converter 302.

Compared to the converter 201, the converter 301 includes a signal output section 330 in place of the signal output section. 230. The signal output section 330 includes a variable capacitance element 331.

The control section 370 adjusts the capacitance of the variable capacitance element 331 according to the voltage $V_{30}$ of the output signal of the signal output section 330. The control section 370 includes a comparator section 371 and a control unit 170. The comparator section 371 compares the voltage $V_{30}$ to a reference voltage, thereby determining whether or not the voltage $V_{30}$ falls within a predetermined range.

The comparator section 371 will be described with reference to FIG. 6, which illustrates the configuration of the comparator section 371 that includes comparators 391 and 392. Since the comparators 391 and 392 have quite the same configuration and operate in totally the same way, only the configuration and operation of the comparator 391 will be described herein without describing those of the comparator 392. The comparator 391 includes first and second comparator circuits 381 and 382. The first comparator circuit 381 receives the output signal of the signal output section 330 and compares the voltage $V_{30}$ to a reference voltage $V_{ref1}$. Likewise, the second comparator circuit 382 receives the output signal of the signal output section 330 and compares the voltage $V_{30}$ to a reference voltage $V_{ref2}$. In this case, $V_{ref1} < V_{ref2}$ is satisfied and the normal range of the voltage $V_{30}$ is defined by $V_{ref1}$ and $V_{ref2}$.

The first and second comparator circuits 381 and 382 output signals $V_{com1}$ and $V_{com2}$, representing the results of comparison, to the control unit 170. If the output signal $V_{com1}$ of the first comparator circuit 381 indicates that $V_{30} \geq V_{ref1}$, the signal is Hi. On the other hand, if $V_{30} < V_{ref1}$, then the signal is Lo. And if the output signal $V_{com2}$ of the second comparator circuit 382 indicates that $V_{30} \leq V_{ref2}$, the signal is Lo. On the other hand, if $V_{30} > V_{ref2}$, then the signal is Hi.

If the respective output signals $V_{com1}$ of the comparators 391 and 392 are both Hi and if the respective output signals $V_{com2}$ of the comparators 391 and 392 are both Lo, then the voltage $V_{30}$ falls within the normal range and the control unit 170 maintains the capacitance of the variable capacitance element 331 without changing it. On the other hand, if at least one of the output signals $V_{com1}$ of the comparators 391 and 392 is Lo, then the voltage $V_{30}$ is under the normal range. In that case, the control unit 170 outputs a control signal Sf to the variable capacitance element 331, thereby increasing the capacitance of the variable capacitance element 331 such that the voltage $V_{30}$ increases. Also, if at least one of the output signals $V_{com2}$ of the comparators 391 and 392 is Hi, then the voltage $V_{30}$ is over the normal range. In that case, the control unit 170 outputs a control signal Sf to the variable capacitance element 331, thereby decreasing the capacitance of the variable capacitance element 331 such that the voltage $V_{30}$ decreases.

The coordinates of the point of contact on the conductor 110 are determined by the ratio of the output voltage of the converter 301 to that of the converter 302. However, if the absolute values of these output voltages were too large or too small, then the coordinate determination accuracy might decrease. For example, even if the point of contact has the same coordinates, the output voltages will have different absolute values depending on whether the contact has been made on the conductor 110 with bare hands or with gloves on. However, as described above, if the voltage $V_{30}$ has fallen out of the normal range, the decrease in coordinate determination accuracy can be minimized by adjusting the capacitance of the variable capacitance element 331 such that the voltage $V_{30}$ goes back to the normal range. In addition, if the variable capacitance element 331 is used, the capacitance can be adjusted without changing the elements.

Optionally, in such a situation where the voltage $V_{30}$ has fallen out of the normal range, the voltage $V_{30}$ may be regulated and brought back to the normal range by changing the numbers of times the variable capacitance element 331 is charged or discharged (i.e., the N value as described for the second preferred embodiment). In this example, if the output signals $V_{com1}$ of the comparators 391 and 392 are both Hi and if the output signals $V_{com2}$ of the comparators 391 and 392 are both Lo, the voltage $V_{30}$ falls within the normal range, and therefore, the control unit 170 does not change the number of times of charging or discharging the variable capacitance element 331. On the other hand, if at least one of the output signals $V_{com1}$ of the comparators 391 and 392 is Lo, then the voltage $V_{30}$ is under the normal range. In that case, the control unit 170 increases the number of times of charging or discharging so as to raise the voltage $V_{30}$. Also, if at least one of the output signals $V_{com2}$ of the comparators 391 and 392 is Hi, then the voltage $V_{30}$ is over the normal range in that case, the control unit 170 decreases the number of times of charging or discharging so as to lower the voltage $V_{30}$. In this manner, if the voltage $V_{30}$ has fallen out of the normal range, the voltage $V_{30}$ may be regulated and brought back to the normal range by changing the numbers of times of charging or discharging the variable capacitance element 331. Then, the coordinate determination accuracy can be improved. In this example, the capacitor 131 may be used instead of the variable capacitance element 331.

Also, if the coordinate detection device 300 can adjust the capacitance of the variable capacitance element 331 and/or change the numbers of times of charging or discharging it automatically (i.e., by automatic gain control), then high coordinate determination accuracy can be maintained.

Furthermore, such an adjustment of the capacitance of the variable capacitance element 331 and/or such a change of the numbers of times of charging or discharging it are also made while the coordinate detection device 300 is subjected to initial calibrations, in which standard conditions are set depending on the specific parameters and operating environment the device in question.

Embodiment 4

Figure 6:
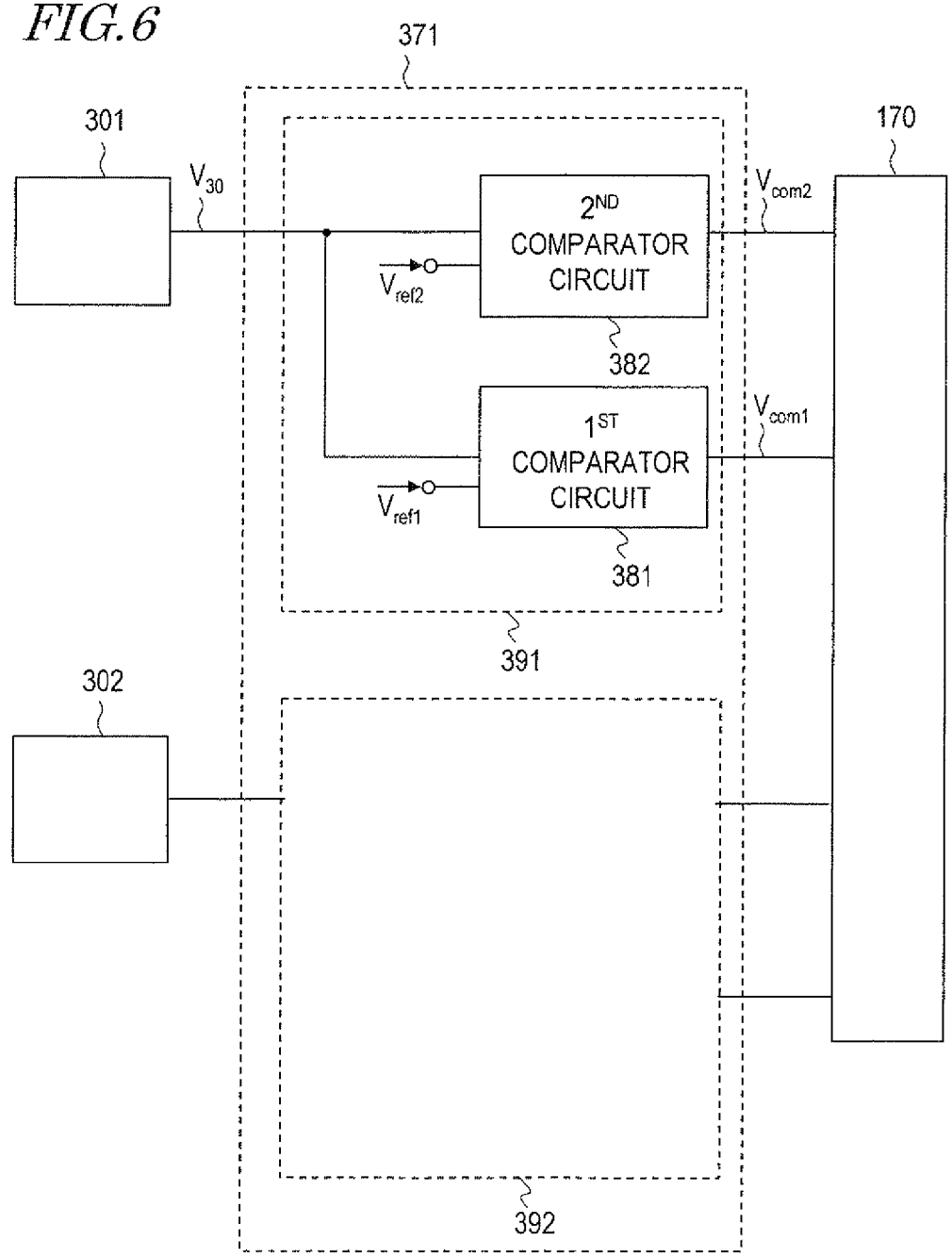
FIG. 6 illustrates a comparator section according to the third preferred embodiment of the present invention.
Figure 7:
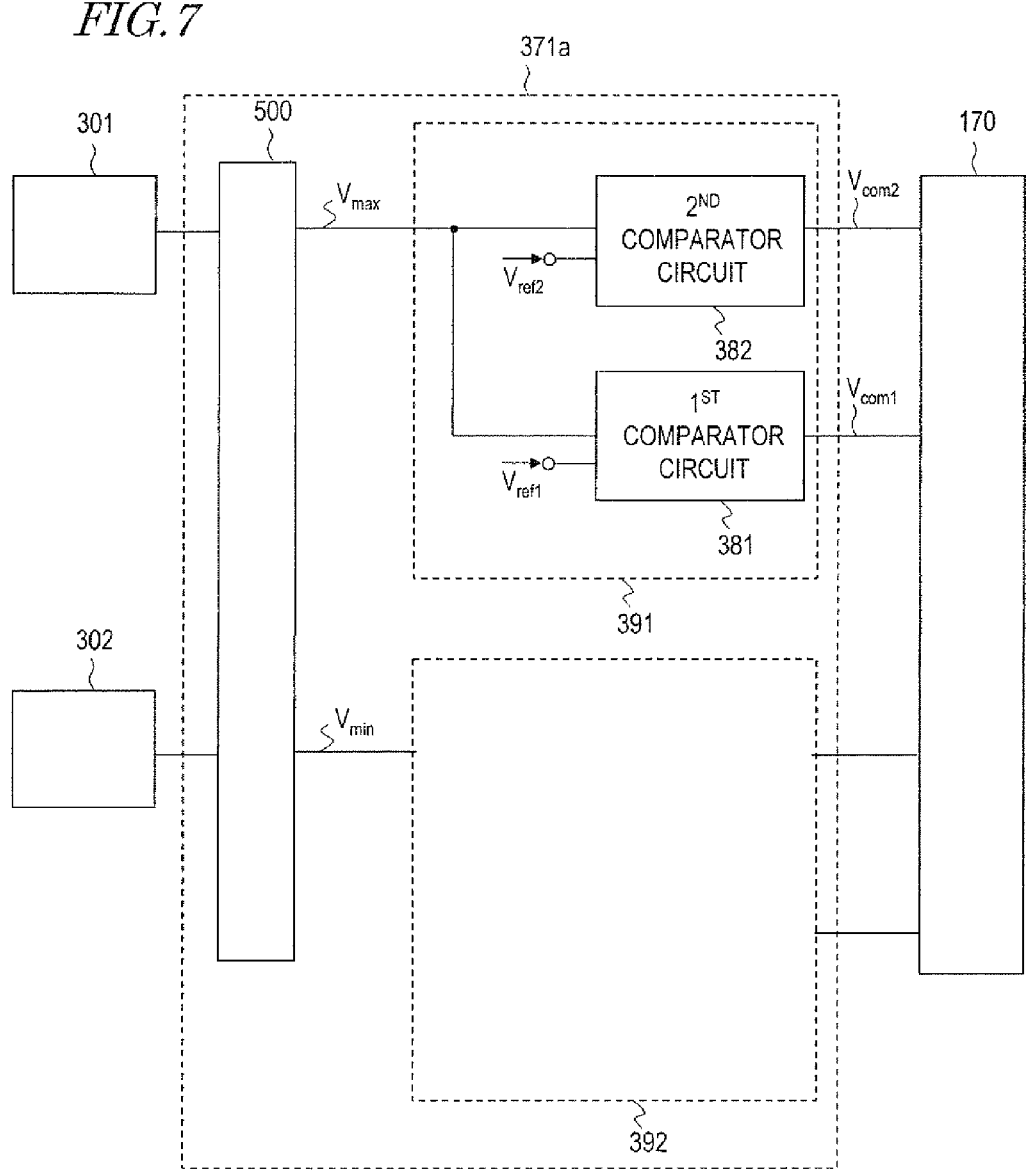
FIG. 7 illustrates a comparator section according to a fourth preferred embodiment of the present invention.

FIG. 7 illustrates a comparator section 371a as a modified example of the comparator section 371 shown in FIG. 6. The comparator section 371a includes not only all components of the comparator section 371 but also a maximum and minimum circuit 500.

The maximum and minimum circuit 500 receives the respective output signals of the converters 301 and 302 and calculates the maximum and minimum absolute values the voltages of those output signals. The maximum and minimum circuit 500 outputs a signal representing the maximum value $V_{max}$ to the comparator 391 and a signal representing the minimum value $V_{min}$ to the comparator 392. The comparator 391 compares the maximum value $V_{max}$ to the reference voltages $V_{ref1}$ and $V_{ref2}$, performs the same operation as already described for the third preferred embodiment, and outputs the signals $V_{com1}$ and $V_{com2}$ to the control unit 170. On the other hand, the comparator 392 compares the minimum value $V_{min}$ to the reference voltages $V_{ref1}$ and $V_{ref2}$, performs the same operation as already described for the third preferred embodiment, and outputs the signals $V_{com1}$ and $V_{com2}$ to the control unit 170. The control unit 170 performs the same operation as already described for the third preferred embodiment, thereby adjusting the capacitance of the variable capacitance element 331 and/or changing the numbers of times of charging or discharging it.

The comparator section 371 shown in FIG. 6 needs the same number of comparators as that of the converters, but the comparator section 371a does not have to own as many converters. With the comparator section 371a, even if three or more terminals are connected to the conductor 110 (i.e., even if there are three or more converters), just two comparators are needed, thus contributing to further simplifying the circuit configuration.

Embodiment 5

Figure 8:
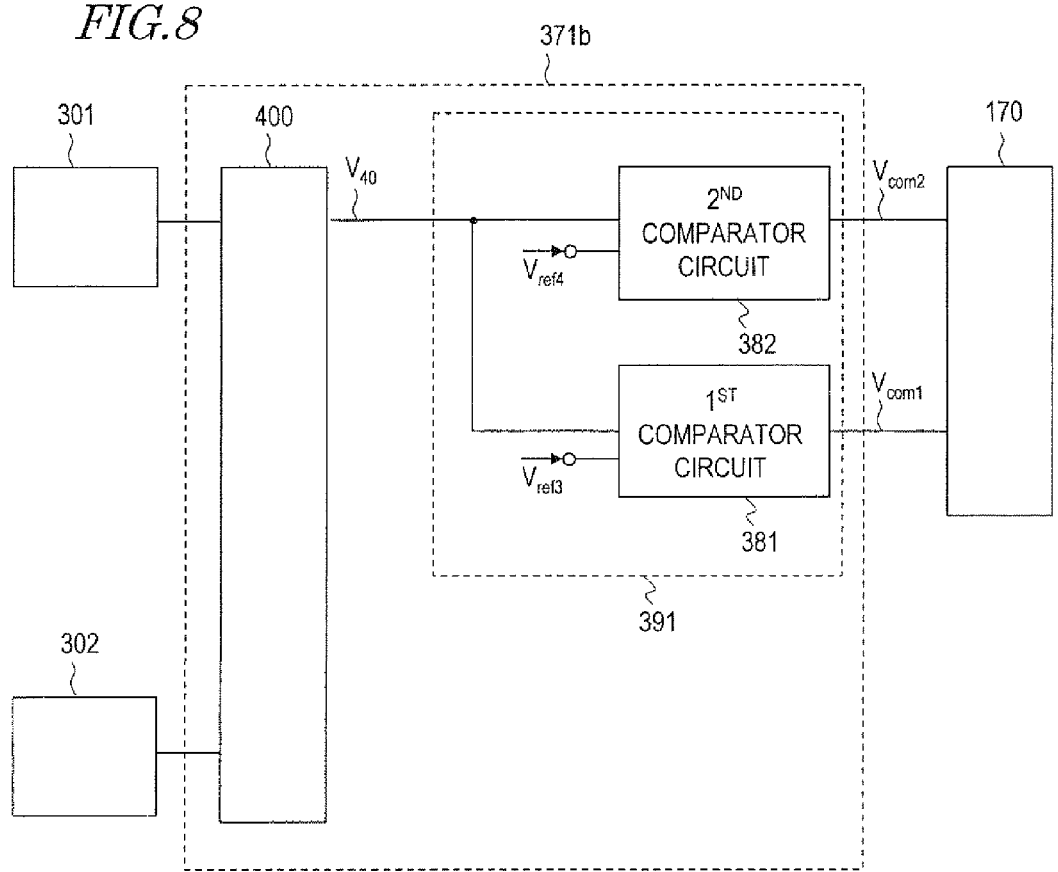
FIG. 8 illustrates a comparator section according to a fifth preferred embodiment of the present invention.
Figure 9:
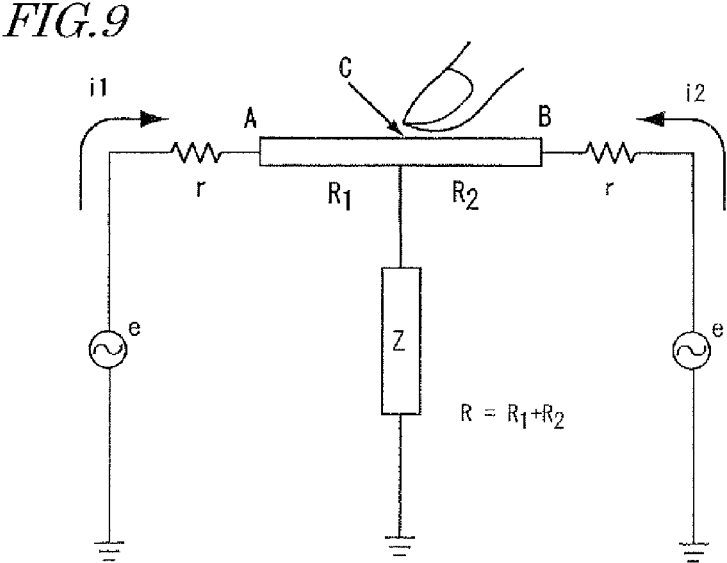
FIG. 9 illustrates the fundamental principle of a coordinate finding method.
Figure 10:
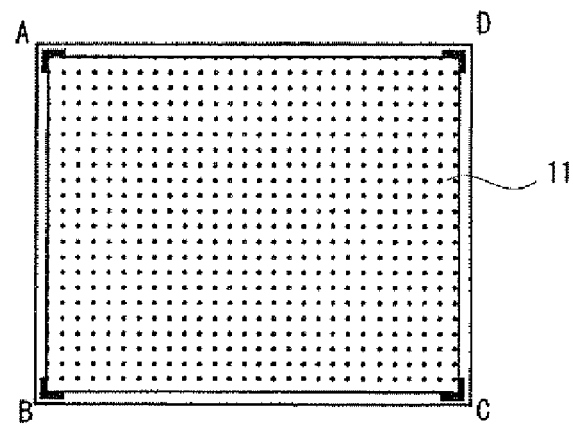
FIG. 10 is a plan view illustrating a touchscreen panel.
Figure 11:
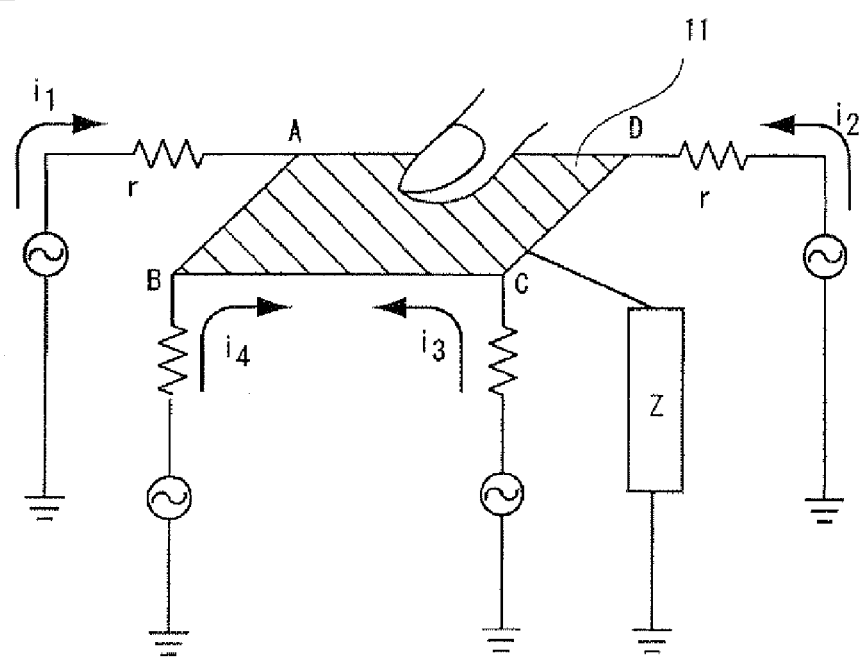
FIG. 11 illustrates the fundamental principle of a two-dimensional coordinate finding method.
Figure 12:
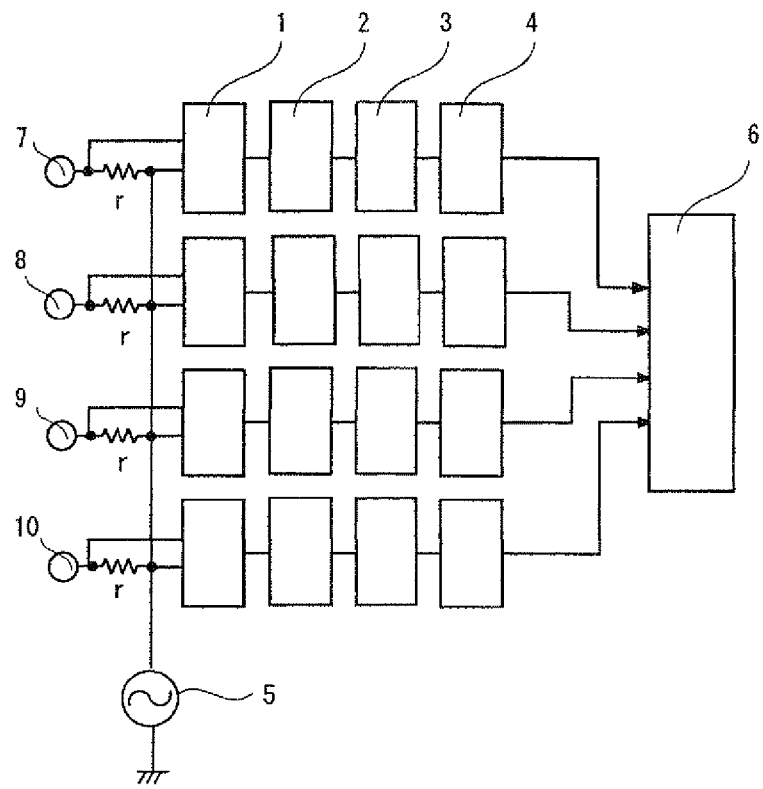
FIG. 12 illustrates a conventional coordinate detection device.
Figure 13:
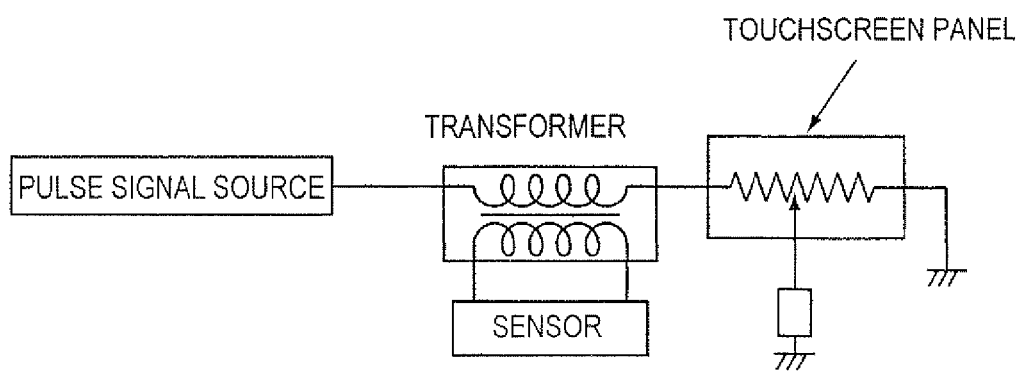
FIG. 13 illustrates another conventional coordinate detection device.

FIG. 8 illustrates a comparator section 371b as another modified example of the comparator section 371 shown in FIG. 6. The comparator section 371b does not have the comparator 392 but includes an adder 400 instead.

The adder 400 receives the output signals of the converters 301 and 302 and adds together the voltage values of these two output signals. Then, the adder 400 outputs a signal representing the sum voltage $V_{40}$ the comparator 391. The first comparator circuit 381 compares the voltage value $V_{40}$ to a reference voltage $V_{ref3}$, while the second comparator circuit 382 compares the voltage value $V_{40}$ to a reference voltage $V_{ref4}$. In this case, $V_{ref3} < V_{ref4}$ is satisfied and the normal range of the voltage $V_{40}$ is defined by $V_{ref3}$ and $V_{ref4}$.

The first and second comparator circuits 381 and 382 output signals $V_{com1}$ and $V_{com2}$, representing the results of comparison, to the control unit 170. If the output signal $V_{com1}$ of the first comparator circuit 381 indicates that $V_{40} \geq V_{ref3}$, the signal is Hi. On the other hand, if $V_{43} < V_{ref3}$, then the signal is Lo. And if the output signal $V_{com2}$ of the second comparator circuit 382 indicates that $V_{40} \leq V_{ref4}$, the signal is Lo. On the other hand, if $V_{40} > V_{ref4}$, then the signal is Hi.

if the signals $V_{com1}$ and $V_{com2}$ are Hi and Lo, respectively, then the voltage $V_{40}$ falls within the normal range and the control unit 170 maintains the capacitance of the variable capacitance element 331 without changing it. On the other hand, if the signal $V_{com1}$ is Lo, then the voltage $V_{40}$ is under the normal range. In that case, the control unit 170 outputs a control signal Sf to the variable capacitance element 331, thereby increasing the capacitance of the variable capacitance element 331 such that the voltage $V_{40}$ increases. Also, if the signal $V_{com2}$ then the voltage $V_{40}$ is over the normal range. In that case, the control unit 170 outputs a control signal Sf to the variable capacitance element 331, thereby decreasing the capacitance of the variable capacitance element 331 such that the voltage $V_{40}$ decreases.

Also, as in the third preferred embodiment described above, if the voltage $V_{40}$ has fallen out of the normal range, the voltage $V_{40}$ may be brought back to the normal range by changing the numbers of times of charging or discharging the variable capacitance element 331.

Figure 5:
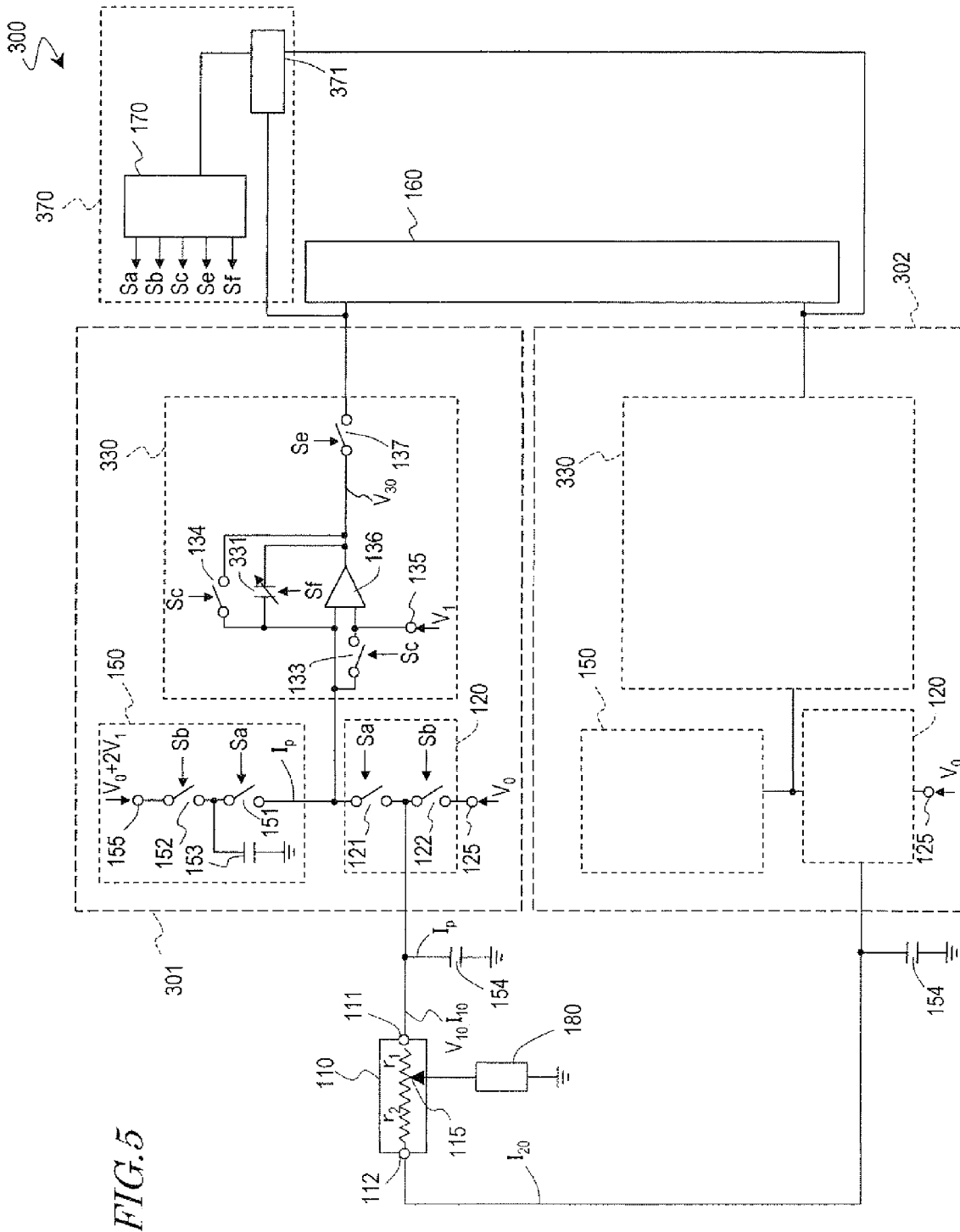
FIG. 5 illustrates a coordinate detection device as a third preferred embodiment of the present invention.

In the coordinate detection device 300 shown in FIGS. 5 and 6, the control unit 170 makes calculations using the output signals of both of the two comparators 391 and 392 and adjusts the capacitance of the variable capacitance element 331 and/or changes the numbers of times of charging or discharging it based on the results calculations. By adopting this comparator section 371b, however, the control unit 170 just needs to make calculations using only the output signals of the comparator 391, without using those of the comparator 392. As a result, the control routine can be simplified.

Also, even if the point of contact on the conductor 110 has changed its coordinates, the sum of the output voltages of the converters 301 and 302 remains substantially the same. That is why by adopting this comparator section 371b, an automatic gain control can get done according to the specific parameters and operating environment of the given device and the magnitude of capacitance of the contact body without being affected by any variation in the coordinates of the point of contact.

The operations to be performed by the coordinate detection device 100, 200 or 300 may be executed by software at least partially. For example, the coordinate detection device 100, 200 or 300 may include a memory to store a program for getting those operations done and a CPU (central processing unit) for reading out and executing such a program. The processing to be done by the control unit 170, the control section 370 and the calculator 160 could also be performed by a CPU that operates following the program.

In the first through fifth preferred embodiments described above, a one-dimensional conductor 110 is supposed to be used for the sake of simplicity as the conductor where the point of contact needs to be located. However, similar operations need to be performed even when a two-dimensional conductor such as a panel is used. Even so, the coordinates can also be determined by Equations (4) and (5), for example.

Also, in the first through fifth preferred embodiments described above, the switching elements may be transistors, for example. But this is just an example and any other type of element may be used as long as the element can change an electrically connected state into an electrically disconnected state, and vice versa. Furthermore, the circuit configurations of the first through fifth preferred embodiments described above are only examples. Alternatively, any other circuit configuration may be adopted as long as the same function and effect are achieved.

INDUSTRIAL APPLICABILITY

The present invention can he used particularly effectively in the field of coordinate detection devices that can locate the point of contact that has been made on a display screen with a finger, for example.

The invention claimed is:

1. A coordinate detection device comprising:
a conductor for locating a point of contact;
multiple terminals that are connected to the conductor at mutually different points;
a signal output section, which includes a charge storage section to store electrical charge there and which outputs a signal with a voltage value representing the quantity of charge stored in the charge storage section;
a setting section for setting a voltage for the charge storage section to a predetermined value;
a first switching section for selectively connecting or disconnecting a particular one of the terminals to/from not only the charge storage section but also a first power supply;
a control section for controlling the operation of the first switching section,
wherein the control section turns the first switching section to change states from a first state in which the particular terminal is connected to the charge storage section but disconnected from the first power supply into a second state in which the particular terminal is connected to the first power supply but disconnected from the charge storage section, and vice versa, a predetermined number of times,
wherein after the states have been changed the predetermined number of times, the signal output section outputs the signal, and
wherein the control section changes the numbers of times of state transition between the first and second states according to the voltage value of the signal; and
a compensator for supplying current, which compensates for current flowing through a parasitic capacitance between the conductor and the first switching section, to the particular terminal, wherein the compensator includes:
a second capacitor, one of two terminals of which is grounded; and
a second switching section for selectively connecting or disconnecting not only the charge storage section but also a second power supply to/from the other terminal of the second capacitor.

2. The coordinate detection device of claim 1, wherein the control section changes the numbers of times such that the voltage value of the signal falls within a prescribed range.

3. The coordinate detection device of claim 1, wherein the signal output section includes multiple signal output sections and the first switching section includes multiple switching sections of a first type, and
wherein each of the multiple terminals is connected to an associated one of the signal output sections by way of an associated one of the switching sections of the first type, and wherein the control section performs a predetermined type of calculation based on the voltage values of the signals supplied from the signal output sections and changes the numbers of times such that a value obtained by the predetermined type of calculation falls within a prescribed range.

4. The coordinate detection device of claim 1, wherein the charge storage section is a first capacitor, and wherein before the states are changed the predetermined number of times, the setting section sets potential levels at two terminals of the first capacitor equal to each other.

5. The coordinate detection device of claim 1, wherein the control section turns the second switching section to connect the other terminal of the second capacitor to the charge storage section but disconnect the other terminal from the second power supply during the first state and to connect the other terminal of the second capacitor to the second power supply but disconnect the other terminal from the charge storage section during the second state.

6. The coordinate detection device of claim 1, further comprising a sensing section for locating a point of contact, which has been made either directly or indirectly on the conductor, by the signal supplied from the signal output section.

* * * * *